Figure 1:
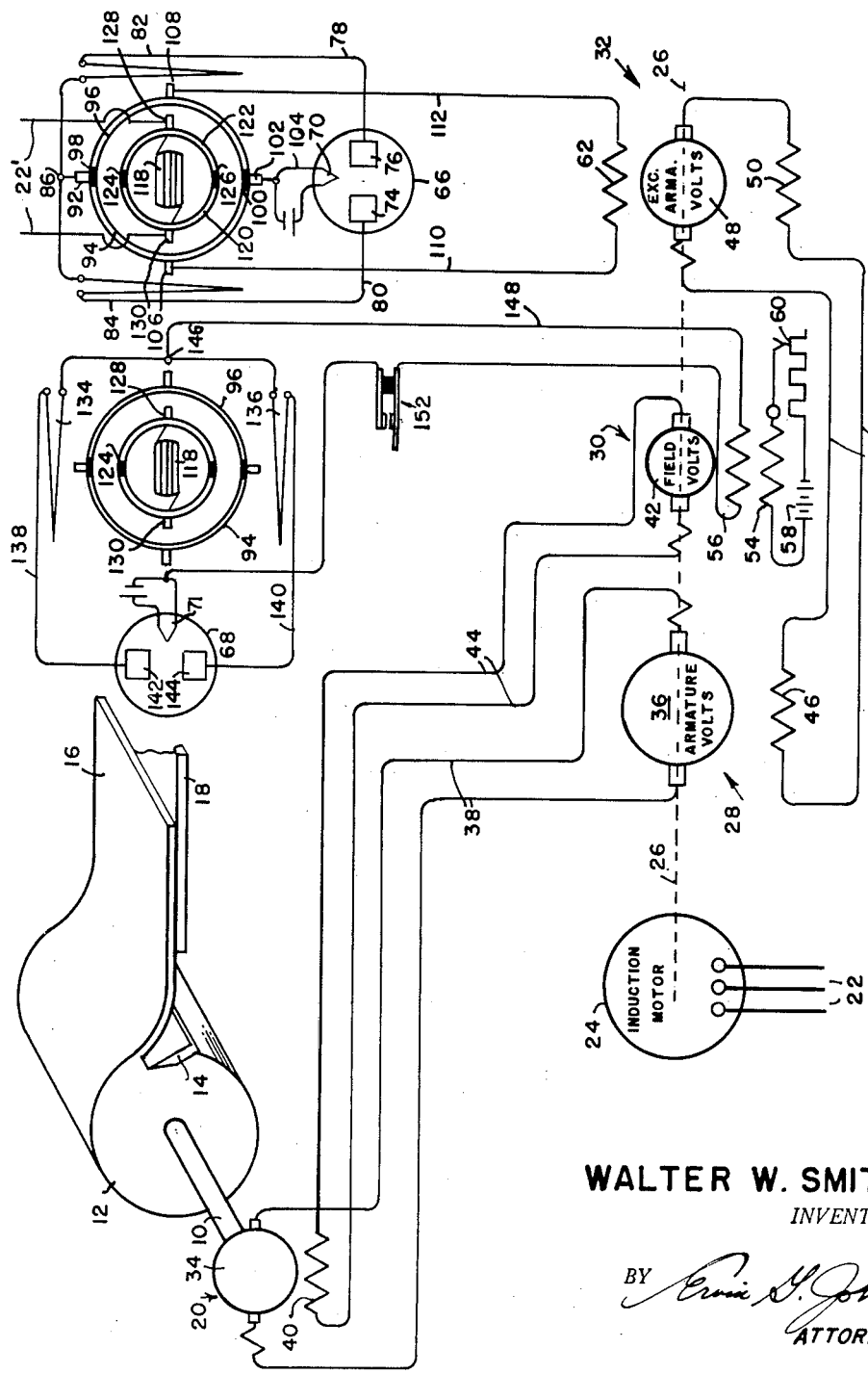

WALTER W. SMITH
*INVENTOR.*

BY
*ATTORNEY*

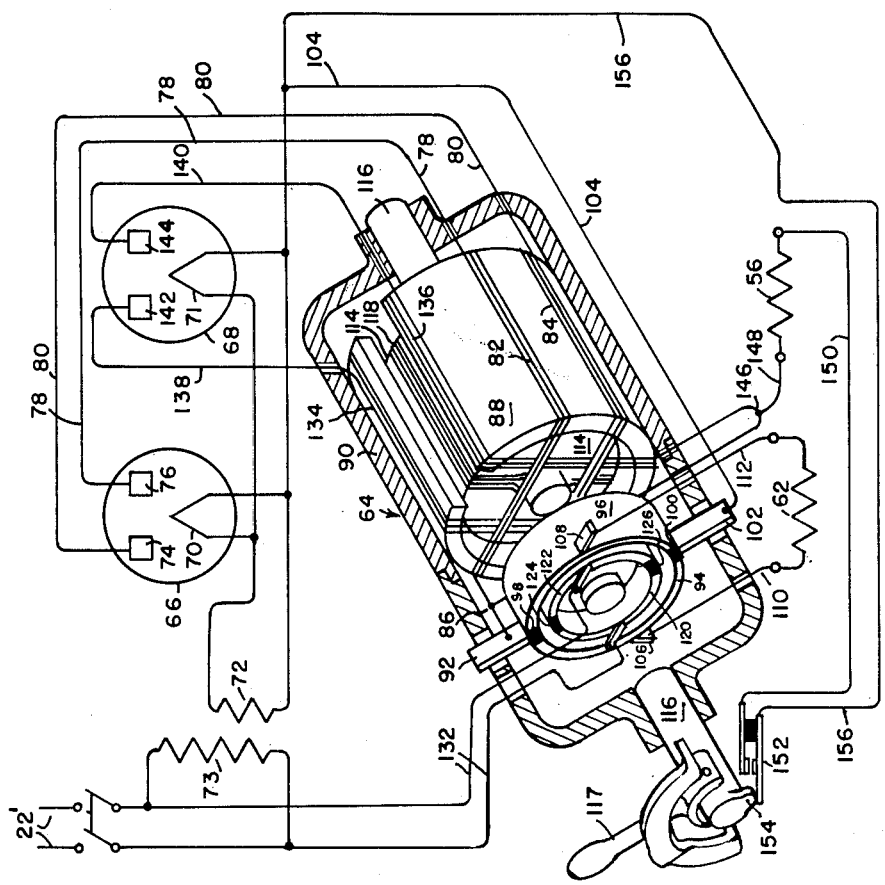

2,762,960

GENERATOR FED MOTOR CONTROL SYSTEM

Walter W. Smith, Eureka, Calif.

Application February 8, 1952, Serial No. 270,533

3 Claims. (Cl. 318—154)

This invention relates to the cutting of logs into a more or less continuous sheet of uniform thickness known as veneer sheet.

In this operation it is desirable to maintain a maximum but more or less uniform speed in the cut stock as it is delivered from the lathe onto a delivery apron or conveyor so that a grading operator can properly grade the material and cause cut-off of the sheet with a minimum delay in the production rate.

In the operation of the lathe the log itself is continuously reduced in diameter and therefore, in order to maintain a fairly constant rate of delivery in linear feet per unit time, the angular time rate of log rotation is desired to be increased as the diameter of the log at the cutting point decreases, even though this increase may not be constant over any great period of time for many reasons about to be referred to.

Due to the non-uniform nature of the log stock great flexibility of the lathe speed and power control under the direct supervision of a human operator is necessary. This is so because, among other things, the logs as initially received by such lathe, are of non-uniform diameter from end to end and are of non-uniform radius from the spindle axis to the log periphery, have large and small knots both evident and hidden, and have various internal defects with reference to which only an agency capable of exercising judgment can act adequately. A very important defect in pine and fir logs is the occasional resinous pitch vein or pocket, which causes various troubles. Free flowing pitch cannot be easily tolerated in the regions of the mill beyond the lathe and it is carefully removed at the lathe or on the cutting shear. When the pitch pockets occur in more or less cylindrical sheets extending through a substantial arc of the log, the lathe blade force, however skillfully controlled by the operator, often causes a correspondingly large arcuate part of the adjacent stock to be broken out of the log. This unavoidable interruption and waste must be carefully watched for and the log rotation stopped when it occurs so that the broken out part may be removed to prevent damage to the surrounding machinery and personnel. Reversal of rotation of the lathe spindle may be necessary for this purpose, and the rate of deceleration required is of a high order.

It is one of the characteristics of veneer lathe operation according to this invention that the power expended at the blade of the lathe may be kept nearly the same at all speeds of the lathe spindle. A motor driving the lathe spindle is required to be capable of delivering about the same value of power to the spindle at all speeds of the shaft. Another way of expressing the requirements in this respect is that the product of torque and speed is about constant or more generally to say that the torque delivered by the motor and resisted by the lathe blade varies about inversely as the speed of rotation of the log by the lathe spindle.

The considerations as expressed in the foregoing are of a general nature and do not necessarily cover all the factors of importance found in the present invention.

However, with such and other considerations in view, some of which are probably not fully appreciated by me, the objects of this invention include the provision of a veneer mill lathe and/or drive therefor which is satisfactory in operation and which fulfills, among other things, the requirements pointed out in the foregoing.

Other objects include providing a motor and motor control system capable of developing a power output at very low speeds which is about the same as, or larger or smaller than, as elected, the power output at the very high speeds. More particularly stated, the motor and its control system provide for the application through manual adjustment of a force of about the same order of magnitude at any radius of the motor axis at any speed of rotation of the motor shaft.

Further specific objects include the provisions of synchronized complementary control means for effecting motor control of the nature indicated in the foregoing.

Other objects and advantages will be evident to those skilled in the art from a consideration of the following specification and claims in connection with the accompanying drawings in which:

Fig. 1 is a schematic diagram of a veneer lathe and its motor drive and control system; and Fig. 2 is a more objective schematic diagram of the manual control apparatus employed in the system as illustrated in Fig. 1.

This application is a continuation in part as to certain features of invention of my prior applications: Ser. No. 603,962, filed July 9, 1945; Ser. No. 76,615, filed February 15, 1949, now Patent 2,671,886, March 9, 1954; and Ser. No. 193,048, filed October 31, 1950, now abandoned, the disclosures of which applications are hereby made a part hereof.

In the drawings, the spindle shaft 10 of a veneer lathe drives a log 12 against a peeling blade 14 to cut a thin sheet of veneer 16 therefrom for delivery to a table or conveyor 18. Suitable and well understood means are provided for feeding the edge of blade 14 radially toward the axis of shaft 10 so as to maintain a constant thickness in the sheet 16 peeled off the log at all times. The power expended at the blade is, of course proportional to many factors, including the blade sharpness, the thickness of the sheet, the toughness of the grain, and the speed of the stock.

The shaft 10 is coupled for direct drive by the rotor of a direct current motor 20 both the armature voltage and field current of which are concurrently varied in generally inverse ratio under the control of an operator placed in a position commanding a full view of the lathe and its operation, and in view of the delivery area 18.

The power to drive motor 20 and its auxiliaries is shown to comprise a source 22 of alternating current, which will usually be polyphase current, capable of delivering power adequate to the needs of motor 20 and its auxiliaries. The power from this source is applied to a polyphase motor 24, preferably of the squirrel cage induction motor type. A shaft 26 is directly connected to the rotor of motor 24. Other means of driving shaft 26 than an electric motor may be utilized in the place of induction motor 24 provided such means develop power characteristics approximating those of motor 24, this motor being superior for this purpose to most forms of prime movers. Mounted on the shaft 26, or otherwise coupled for driving therefrom, are the rotors of a direct current "motor armature current" generator 28, a direct current "motor field current" generator 30, and a direct current "generator field current" generator 32. The generators 30 and 32 may more expediently be termed "the direct current motorfield exciter generator or motor exciter" and the direct current "generator field exciter" generator or simply "generator exciter." All three of the armature rotors of generators 28, 30 and 32 receive their driving forces and power from shaft 26 and the voltages generated thereby are proportional to, among other factors, the speed of shaft 26.

The generator 28 applies its direct current voltage and consequent current flow in the armature 34 of direct current lathe motor 20 placed in series with the armature 36 of generator 28 by a pair of conductors 38; and the generator 30 sends direct current to the field winding 40 of motor 20 from the armature 42 of generator 30 over a pair of conductors 44.

The generator 28 includes a field winding 46 which is connected in series with the armature 48 of generator exciter 32 and in series with a field winding 50 of the generator exciter 32, by means including a pair of conductors 52.

The motor exciter 30 includes two field windings 54 and 56. Winding 54 has a source of current 58 which, while illustrated as a battery, is for obvious reasons, preferably a rectified source from the alternating current supply 22'. The circuit of winding 54 contains means 60 for adjusting the current to flow in the winding, such means being shown as a variable rheostat.

The second field winding 56 of motor exciter 30 is intended for the controlled unidirectional flow therethrough of direct current excitation variable in amount and in a specific manner correlated with a manner of variation of voltage and current generated by the generator 36.

The generator 32 is provided with a field current winding 62 the direct current through which is controlled concurrently and manually with the control of direct current in winding 56.

Full wave rectified alternating current variable in value between zero and maximum value, and reversible in direction of current flow at the minimum or zero values of such rectified current, is manually made available to the generator exciter field winding 62 by translation of a single phase of alternating current from the A. C. source 22' usually derived by transformer action from source 22. In this way the direct current voltage applied to armature 34 of motor 20 may be reversed and varied from zero voltage to a maximum value in both senses from zero. The flow of direct current in winding 40 of motor 20 being always in one direction, and the value of this field current being variable in inverse proportion to the voltage applied to armature 34, the motor 20 applies a fairly constant force to blade 14 at any speed to which the motor is adjusted. This means that the torque applied by the motor to shaft 10 varies inversely as the motor speed. This torque is a maximum near zero speed and the torque-speed characteristic curve of the motor is about the same in both directions of rotation, although the direction opposite the direction for cutting does not utilize all characteristics available.

The translation of alternating current from a constant line voltage applied at 22' to a current of continuously variable rectified and reversible value and the translation from the same source to a rectified unidirectional current of continuously variable value irreversible in direction, with the two rectified currents varying inversely to each other as respects their magnitudes is accomplished by means including a controller 64 and rectifiers 66 and 68.

The rectifiers 66 and 68 may be of the two anode, one cathode type, having heated cathode filiments 70 and 71 heated, as shown in Fig. 2, from the secondary winding 72 of a filament transformer having its primary windings 73 fed from supply 22'. The respective anodes 74 and 76 of rectifier 66 are connected by conductors 78 and 80 to the outside terminals of a stationary transformer winding comprising two coils 82 and 84 joined at a common terminal 86 at the median voltage connection of the winding 82—84, the windings being wound continuously on a stationary laminated iron magnetic core 88 secured in frame 90.

The common terminal 86 of coils 82 and 84 is connected to a brush 92 riding on the cylindric surface of a rotary arcuate contactor formed of two arcuate slip ring segments 94 and 96 insulated from each other and separated by insulating materials at 98 and 100. The shown position is the neutral position wherein the circuits for coils 82 and 84 are interrupted by insulation 98, and as will appear presently, this position corresponds to zero voltage induction in coils 82 and 84.

A second brush 102 is related to segments 94 and 96 in a manner similar to the relationship of 92 thereto, being placed diametrically opposite thereto to register with insulator 100 in the neutral position shown. A conductor 104 extends from brush 102 to the cathode 70 of tube 66. A pair of brushes 106 and 108 contact the segments 94 and 96 midway between brushes 92 and 102 and are joined by conductors 110 and 112 with field winding 62 of generator 32.

A rotating core 114, carried on and rotated by a shaft 116 (shown partially removed along its axis) journalled in frame 90, carries a primary coil winding 118 arranged to have a single straight axis of magnetic induction perpendicular to and through the axis of shaft 116, the magnetic axis of the primary coil winding 118 being in about the same plane perpendicular to its axis of rotation as the magnetic axes of coils 82 and 84. The terminals of coil 118 connect with semi-cylindric arcuate segments 120 and 122 carried on shaft 116 and electrically separated by insulators 124 and 126. All of the arcuate segments 94, 96, 120, 122 are insulated from each other and the shaft 116 but secured thereto for rotation therewith. A pair of stationary brushes 128 and 130, positioned ninety degrees from insulators 124 and 126, are connected by conductors 132 to the alternating current source 22'.

The operation of the devices of Fig. 2 as so far described is as follows: In the position shown alternating current of approximately fixed voltage and current value flows from and to conductors 132 through brush 130, segment 120, coil 118, segment 122 and brush 128. Because, in the shown position, the magnetic axes of winding 82—84 and winding 118 are perpendicular to each other, no voltage is induced in winding 82—84. Rotation of the shaft and winding 118 in either direction from the shown position causes induction of voltage in winding 82—84 alternating in character and increasing as the sine of the angle of such rotation increases. The path for flow of current is, at small angles of displacement from neutral position, effectively blocked by the valve 66 which will not conduct current until a minimum voltage is applied from anode to cathode. This voltage is achieved after insulators 98 and 100 pass from registry with brushes 92 and 102, thus preventing arcing at these brushes.

If the shaft 116 is rotated sufficiently clockwise from Fig. 2 position, current flows, in both half cycles, but alternately in and from coils 82 and 84, in circuit serially from either coil to terminal 86, brush 92, segment 94, brush 106, conductor 110, through field winding 62, conductor 112, brush 108, segment 96, brush 102, conductor 104, cathode 70; and to anode 76, conductor 78 and coil 82, or to anode 74, conductor 80 and coil 84. Further clockwise rotation simply increases the unidirectional current flow through 62 from conductor 110 to conductor 112. This causes the generation of voltage in generator armature 48 to produce rotation of motor 20 say clockwise.

If however, the shaft 116 is rotated counterclockwise from the shown neutral position sufficiently, the current flows in circuit through brush 92, segment 96, brush 108, conductor 112, winding 62, conductor 110, brush 106, segment 94, to brush 102, that is, in the opposite sense to that previously described, so that motor 20 reverses its direction of rotation and its speed in such reverse direction in proportion as counterclockwise rotation of shaft 116 is increased by actuating handle 117.

The winding 56 of motor field exciter generator 30 is fed pulsating direct current alternately by two coils 134 and 136 of a unidirectionally wound winding on core 88, the endmost terminals of which are connected by conductors 138 and 140 to the anodes 142 and 144 of electron valve 68 and the center tap 146 of which winding is connected to winding 56 by a conductor 148. The other terminal of winding 56 is connected by conductor 150 to one terminal of switch 152 which is opened by a cam 154 on shaft 116 only in the neutral position or region of handle 117. The other terminal of switch 152 is connected by a conductor 156 to the cathode 71 of valve 68.

The planes determining the magnetic axis of winding 134—136 are perpendicular to the corresponding planes of winding 82—84 and the magnetic axis of windings 134—136 is perpendicular to the magnetic axis of windings 82—84 and substantially in a common plane therewith perpendicular to the axis of shaft 116. In the neutral position shown, a maximum voltage is induced in coils 134 and 136 from coil 118. Current flows in maximum value immediately switch 152 closes, incident to initial rotation of shaft 116 in either direction since valve 68 becomes conductive immediately switch 152 closes. The direction of current flow through winding 56 is the same irrespective of the direction of rotation of shaft 116 from the neutral position shown and is magnetomotively additive with winding 54. The value of this current diminishes as the angle of turning of shaft 116 increases from neutral, but such diminution has little effect on the speed because the adjustment of windings and currents is such that motor 20 has its winding 40 operating for supersaturation of the motor field core, and decreasing the excitation can occur over a large movement of the shaft 116 without changing the value of the field excitation effect. The speed change is due almost entirely to the variation in the current applied by generator 36 on the motor armature 34. Thus high torques are given at the lowest speeds for which the rotating log 12 is desired to run. Adjustments are, of course, secured at the rheostat 60 in the fixed field winding, this winding serving also as security against weakening the motor field 40. When the higher speeds are reached, little, if any current flows in winding 56, and then, of course, the excitation of winding 40 is substantially constant in accordance with the adjustment at 60.

I claim:
1. A power source for the work drive spindle of a veneer cutter or like machine where the torque and revolutions per unit of time of such spindle are variable but the force on a cutter as supplied by such work drive spindle and the power supplied to such spindle are constants for each setting of a controller, comprising: a direct current spindle driving motor having an armature winding and a separately excited field winding, a first generator and load circuit parts connected to apply its generated voltage and current to the armature of the spindle driving motor and including a separately excited field winding; a second generator and load circuit parts connected to apply its generated voltage to the field winding of the first generator and comprising a separately excited field winding; a third generator and load circuit parts connected to apply its generated voltage to the field winding of the spindle driving motor and comprising a separately excited field winding; and exciting means including a controller transformer having a primary and a plurality of secondary windings having field axes variously angularly related to each other and rotatable together relative to said primary winding, with one of said secondaries connected to the field windings of said second generator and another of said secondaries connected to the field windings of said third generator, so that as this so applied excitation of one generator increases the other decreases.

2. The combination of claim 1 which includes means for rectifying such excitation and a single operative means both for effecting such relative rotation and for changing the polarity of the excitation of one of said generators but not the other as the excitation of such one approaches a minimum value.

3. The combination of claim 2, which includes, as part of said last means, means for opening the excitation circuit of the other of said generators as such polarity is about to be changed.

References Cited in the file of this patent
UNITED STATES PATENTS

| | | |
|---|---|---|
| 1,745,890 | Dike | Feb. 4, 1930 |
| 1,837,803 | Weston | Dec. 22, 1931 |
| 1,877,013 | Moore | Sept. 13, 1932 |
| 1,881,011 | Wittkuhns | Oct. 4, 1932 |
| 1,965,606 | Powell | July 10, 1934 |
| 2,340,532 | Jackson | Feb. 1, 1944 |